June 25, 1963 S. S. GUTERMAN ETAL 3,095,554
INTELLIGENCE CONTROL SYSTEMS
Filed March 22, 1955 2 Sheets-Sheet 1
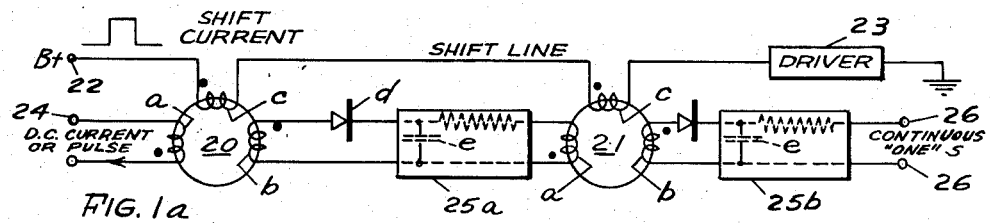
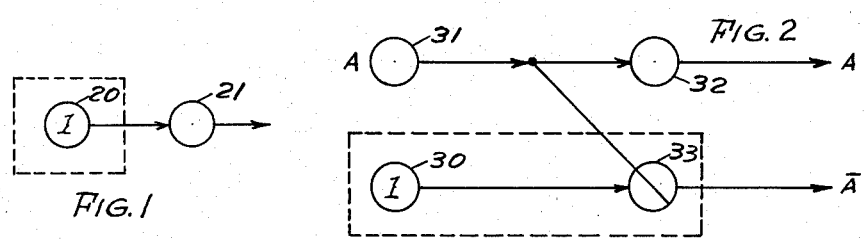
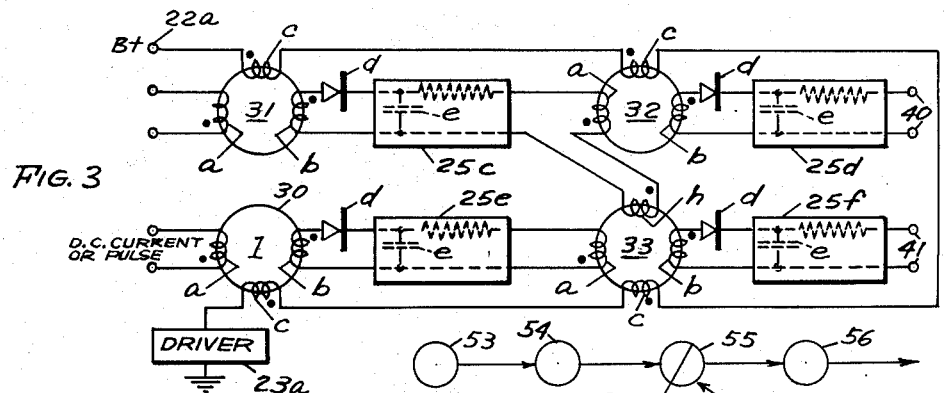
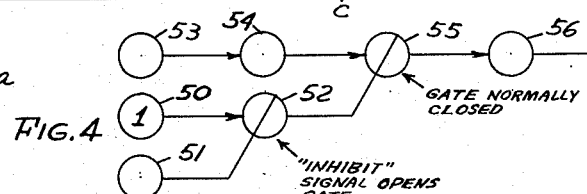
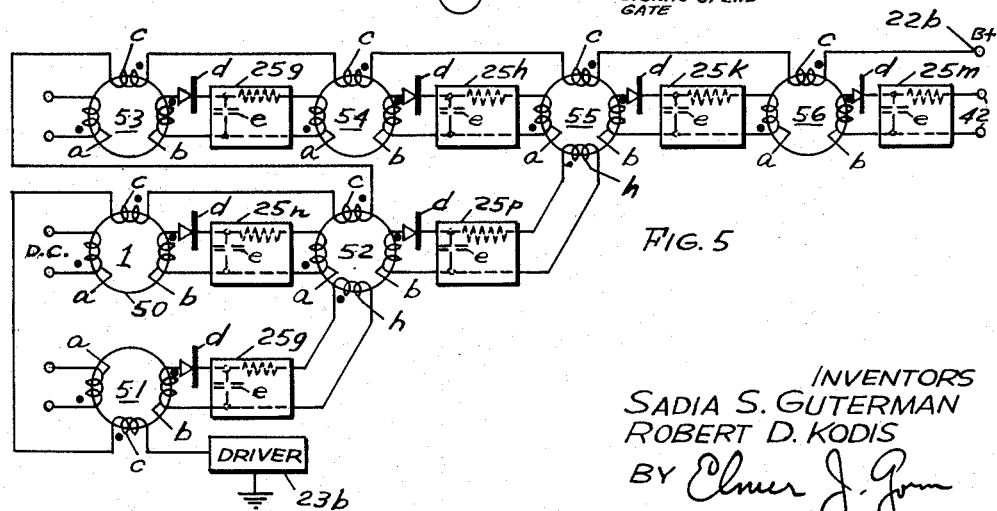
INVENTORS
SADIA S. GUTERMAN
ROBERT D. KODIS
BY Elmer J. Gorn
ATTORNEY

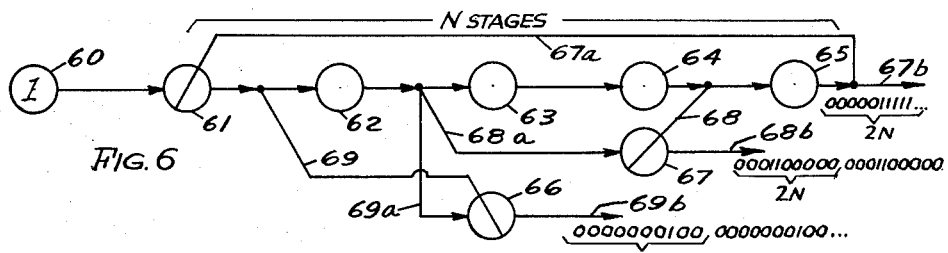
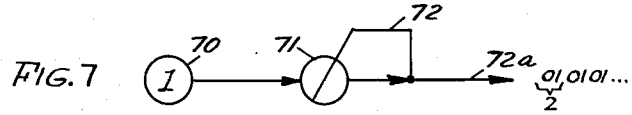
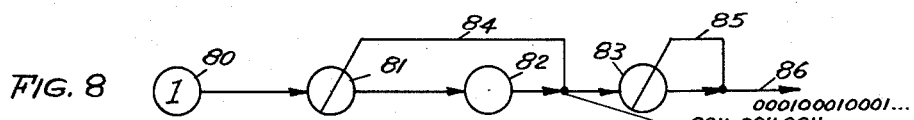
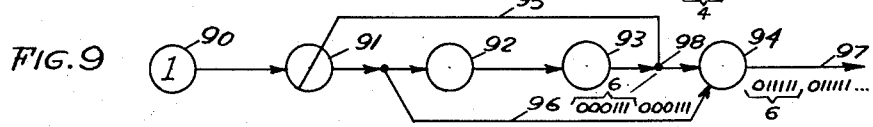
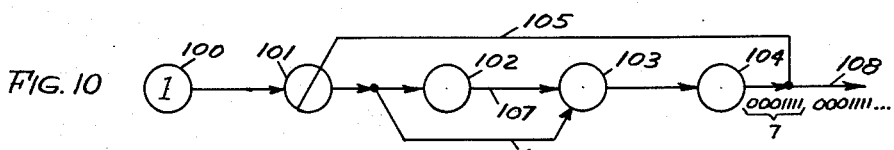
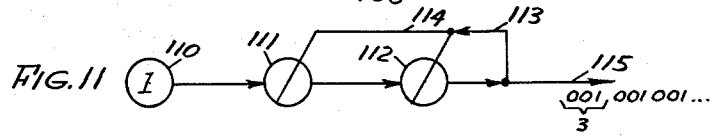
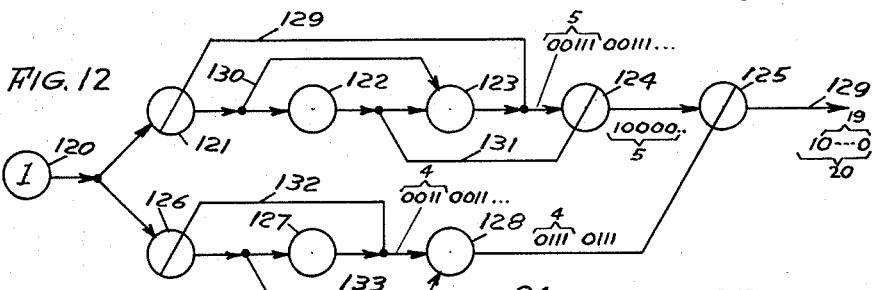
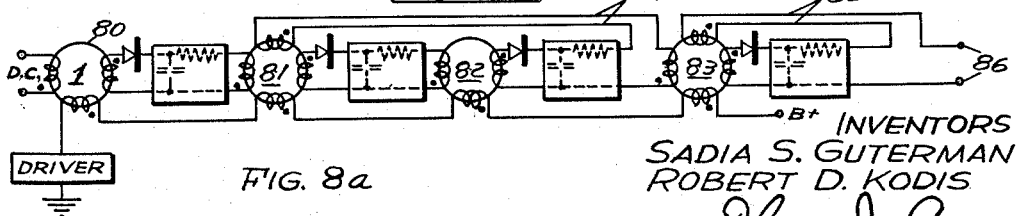
INVENTORS
SADIA S. GUTERMAN
ROBERT D. KODIS 3,095,554
INTELLIGENCE CONTROL SYSTEMS
Sadia S. Guterman, Dorchester, and Robert D. Kodis, Brookline, Mass., assignors to Raytheon Company, Lexington, Mass., a corporation of Delaware
Filed Mar. 22, 1955, Ser. No. 495,976
8 Claims. (Cl. 340—174)

This invention relates to intelligence control systems, and particularly to the storage and transmission of electrical energy representative of numerical digits to be counted or informational or logical components to be utilized in a computing operation or in a machine or apparatus for controlling functional sequences.

The invention is characterized by the application to one or more two-state elements of control circuitry functioning to produce predetermined reactions and operational patterns in said element or elements by utilization of pattern generating properties inherent in said circuitry.

The invention is applicable to multi-stage computing or data-handling devices, among other uses, which devices may include, in each stage, one or more cores of ferromagnetic material having high magnetic retentivity and a relatively open hysteresis loop characteristic, approaching the rectangular in shape, so that when a core is magnetized to a condition of flux saturation of one polarity, it tends to remain in such state until the direction of flux saturation is reversed, as by application of a flux-reversing force in the form of a "shift" pulse of current delivered to a "shift" winding carried by the magnetic core. To such a known arrangement the present invention adds the concept of causing one or more of the magnetic core components of a given arrangement to deliver signal-representing current pulses of a preassigned significance in a constant, unchanging pattern, with the signal output pulses of like significance following one another in unbroken progression at the rate of one signal pulse for each pulse-producing time interval. To accomplish this result, the invention provides a source of continuous biasing current of unchanging polarity, or a permanent biasing magnet of unchanging polarity, for shifting the subject core or cores into a predetermined magnetic state and holding said core or cores in said state continuously, except for the relatively brief portion of each successive operational interval when the "shift" or "read-out" pulse is being applied, the so biased core or cores returning to said predetermined state immediately following termination of each successive "shift" or "read-out" pulse, so that a new signal of the preassigned significance is delivered by said core or cores for each successive shift pulse application.

This and other characteristics of the invention will be apparent as the description progresses, reference being had to the accompanying drawings wherein:

FIG. 1 indicates, by use of logical symbols, the delivery of a continuous series of signals of like significance, at a frequency corresponding to the repetition rate of the "shift" or "read-out" pulses;

FIG. 1a shows electrical components and circuitry for putting into practice the continuous pattern delivery procedure suggested by FIG. 1, and constituting an embodiment of the invention;

FIGS. 2 and 4 indicate, symbolically, two distinct applications of the principle embodied in FIG. 1;

FIGS. 3 and 5 show electrical components and circuitry for embodiments of the procedures indicated in FIGS. 2 and 4 respectively;

FIGS. 6 to 12, inclusive, indicate by symbols still other embodiments of the invention; and FIG. 8a shows electrical components and circuitry conforming to the arrangement suggested in FIG. 8.

Referring first to FIGS. 1 and 1a, magnetic cores 20 and 21 have input windings "a," output windings "b" and shift windings "c," the latter being serially connected in a circuit energized from a B+ source 22 at time intervals determined by the application of triggering energy to driver 23. The core 20 has its input winding connected for reception of energizing current from a continuous current source 24, so that the said core 20 is held in a condition of magnetic flux saturation of such a polarity as to represent an arbitrarily assigned digital value, herein assumed to be the binary digit "1." This polarity is reversed momentarily each time driver 23 is triggered to cause a shift pulse to flow through windings "c" of cores 20 and 21, and such momentary reversal is effective to cause "read-out" of the "1" signal to the succeeding core 21, by way of the intercore circuit consisting of unidirectional impedance diode "d" and delay network 25a, the latter having time delay elements including at least a condenser "e" and related units for effecting a time delay long enough to insure completion of the saturation polarity-reversing process before the transferred signal energy enters winding 21a.

Upon completion of the signal read-out operation just described, core 20 reverts to its normally prevailing saturation polarity, by reason of the continuous biasing action of the current flowing in uninterrupted fashion through the winding 20a. Because of this immediate reversion to the state representative of a "1" binary signal, at the conclusion of each read-out, there is always a new "1" signal available for read-out on the next succeeding application of shift current to the shift winding 20c. In this manner there is assured a "1" signal output for each operating period of the register illustrated in FIG. 1, which continuous output of "1" signals will be available at output terminals (with a one-period time lag because of the intervening core 21 and delay network 25b, duplicative of the network 25a).

This unbroken chain of "1" signals at terminals 26 may serve as "clock" pulses or timing pulses for program control, either directly, or by interaction logically with related stages of data-handling registers or other logical structures adapted to respond to such unbroken succession of control pulses, after accumulation thereof to a predetermined total.

Obviously, the current flowing continuously in winding 20a should be large enough to switch core 20 completely to the "1" registering state in the time interval elapsing between successive applications of shift current to winding 20c. Stated differently, the shift pulse repetition rate should have a value that is chosen with due regard for the time factor representing maximum core flux shift time (usually measured in microseconds). As heretofore noted, a small permanent magnet may be applied to core 20 to bias it to its "1" registering state, as a substitute for D.C. input winding 20a.

The "1" generating core 20, in place of feeding into a "1" transmitting or relaying core, such as core 21 of FIG. 1a, may alternatively feed into a signal-complementing core, such as core 33 of FIGS. 2 and 3. In computing operations, it is frequently desirable to cause "A" and "Ā" signals to be delivered simultaneously to parallel output terminals, such as terminals 40 and 41 of FIG. 3, in response to entry of an "A" signal at a single input point such as the input winding 31a of core 31 of FIGS. 2 and 3. To produce such a "complementing" signal "Ā" from an input signal "A," the output of core 31 is branched to cores 32 and 33, entering winding 32a in normal polarity, and entering winding 33h in opposite polarity. Core 33 also receives "1" signals continuously from the "1" generating core 30 (corresponding to core 20 of FIGS. 1 and 1a) and, as windings 33a and 33h are oppositely poled (as indicated by the opposite positioning of the "dots" adjacent said windings) the "1" input to core 33 by way of input winding 33a is inhibited by the simultaneous input to winding 33h of current of opposite polarity. The result is a retention of core 33 in the "0" state of saturation to which it is normally biased by reason of the polarity of the shift pulses recurrently applied to its winding 33c from source 22a, under the control of driver 23a. Accordingly, the next succeeding shift ("read-out") pulse applied simultaneously to the serially connected read-out windings 32c and 33c will cause the generation in winding 32b of "A" output signal energy, but no generation in winding 33b of any corresponding output signal energy, since core 33 has been retained in the "0" state by the inhibiting action of the winding 33h input energy upon the winding 33a input energy. Hence (after the predetermined delay of X microseconds as determined by the composition of delay networks 25d and 25f, respectively, corresponding to those of FIG. 1a) output terminals 40 and 41 will receive "A" and "$\bar{A}$" signals, respectively, to indicate affirmation and negation, for logical program control purposes.

In FIG. 5 a magnetic shift register is shown, consisting of saturable cores 53 to 56, inclusive, interconnected through unidirectional impedance diodes d and delay networks 25g to 25m (corresponding to the diodes and delay networks similarly designated in FIGS. 1a and 3) to deliver to output terminals 42 signal energy representative of the signal energy entered in the register by way of input winding 53a of core 53, as modified by the operation of a gating circuit consisting of a "1" generating core 50 and two "inhibit" control cores 51 and 52. The effect of "inhibit" energy delivered to winding 55h is to nullify any "1" signal energy delivered to winding 55a in a given digital period; hence the core 55 may be described as a "normally closed gate." This "gate" will be opened, however, during any digital period when winding 55h fails to receive "inhibit" energy.

Such failure will occur following each occasion of entry of gate-opening signal energy into winding 51a of core 51, for the ensuing delivery of output energy to "inhibit" winding 52h, of a polarity opposite to the "1" energy concurrently flowing into winding 52a (from "1" generating core 50) will prevent generation of an output in winding 52b when the next succeeding read-out pulse reaches widing 52c. Thus the core 55 gate is opened by the omission of inhibit energy delivery to winding 55h for the duration of the cited operational interval.

More complex patterns can be handled by feeding a chain of cores from a "1" generating core, and introducing feedback and advance feed procedures between selected cores, to inhibit or mix with the main flow path of intelligence transmission. Examples of such embodiments of the invention are indicated by use of logical symbols in FIGS. 6 to 12, inclusive, with the circuitry for the FIG. 8 scheme being illustrated in FIG. 8a. Each of FIGS. 6 to 12 indicates means for establishing a different word pattern for program control or data processing, or time-spaced orders.

In FIG. 6 there is shown a pattern arrangement consisting of a chain of cores having provision for inhibit feedback from the final stage back to the first stage. If the number of stages in the chain (exclusive of the "1" generating core 60) be represented by the symbol "N," the resulting pattern will be 2N digits in length, and will consist of N 0's followed by N 1's; that is, after N deliveries of "1" representing signal pulses, core 61 will have "inhibit" energy fed back to it, so that the next "1" signal coming in from the "1" generating core 60 will not get through core 61; hence a "0" signal will pass progressively along the cores 61 to 65, then back to core 61 via the feedback connection 67a. The arrival of this "0" back at core 61 will permit the start of a new cycle of "1" deliveries by core 61, with each new cycle of 1's running for N intervals, and followed each time by a "0" cycle, also of N intervals duration. Thus it requires 2N time intervals to complete a full pattern, consisting of N "1" digital values plus N "0" values, for utilization at output point 67b. In the actual case shown in FIG. 6, "N" is five.

On the other hand, if lateral links are inserted as indicated at 68 and 68a in FIG. 6, with the core 67 receiving the output of cores 62 and 64 (by way of links 68a and 68) the "2N" pattern at output point 68b will be . . . . 0001100000 . . . ., due to the inhibit effect of the line 68 content upon the line 68a content. The applicable rule is that if an external core (such as core 67) is fed from two different places of opposite polarity, "S" units apart, the sequence of 2N digits will contain S 1's, in the relative positions occupied by the bracketed cores; hence, if the lateral links are inserted as indicated at 69 and 69a in FIG. 6, with the core 66 receiving the output of cores 61 and 62 (by way of links 69 and 69a) the "2N" pattern, at output point 69b, will be . . . 0000000100, since all 1's except the seventh "1" entering core 66 are converted to 0's by the inhibit effect of line 69 against line 69a.

While FIG. 6, as above noted, shows an arrangement in which "N" has a value of five, FIG. 7 shows an arrangement in which "N" has a value of one; that is, the pattern reverses after every digital representation, so that the output at point 72a will be . . . . 0101 . . . This is because the output of core 71 (supplied by the "1" generating core 70) is immediately fed back to the core, by way of feedback link 72, functioning to inhibit the "1" signal content coming in from core 70, in a manner similar to the feedback inhibiting operations in the heretofore-described FIG. 6 arrangements.

If two arrangements are connected in tandem, with the first arrangement having, say, two cores and the second arrangement only one, as indicated at 81, 82, and 83 in FIGS. 8 and 8a, the result will be a pattern having a repetition cycle of four digits at the output point 86.

A pattern of a single "0" and the rest 1's in a sequence of 2N informational "bits," or digital values, is obtained if the outputs of the first and the final cores of the FIG. 6 arrangement are buffered. For example, the FIG 9 arrangement yields a pattern . . . . 011111011111 . . . ., at output point 97, whereas the pattern at point 98 would be . . . . 000111000111 . . . .

Sequences of odd numbers of bits are also possible. Thus, in a chain of N stages, with an inhibit feedback (as at 105, FIG. 10) from the final stage (104) back to the first stage (101), and a mixing (buffering) of the outputs (as at 106 and 107) of two adjacent stages (101 and 102) feeding the following stage (103) the result is a pattern of N 1's in a sequence of (2N—1) bits, at point 108.

Another example of an odd sequence is presented in FIG. 11. The output pattern for this arrangement is . . . . 001001 . . . , that is, a repetition cycle of three bits per cycle. In this arrangement the output of core 112 feeds back over lines 113, 114 for inhibiting effect upon core 111 as well as upon core 112, to produce the pattern indicated at point 115.

Two pattern generators (such as the generator 121–125 and the generator 126–128 of FIG. 12, with sequence lengths of five and four stages, respectively) can, by interaction, create a pattern whose length will be the product of the two component lengths, in the illustrated case, twenty units, and the composition of the pattern at the final point 129 will be as indicated; that is, a single "1" followed by 19 0's. The output at intermediate points would be as indicated.

The "1" generating cores 80, 90, 100, 110 and 120 of FIGS. 8 to 12, respectively, are of course the same, in structure and mode of operation, as those of FIGS. 1 to 7, above described.

One advantage common to all the suggested arrangements is that the patterns obtained need not be written in or stored at any part of the system. The patterns originate and repeat automatically and are never "lost," even after loss of power or the replacement of a component, since the magnetic cores can retain their inputs indefinitely. Another common advantage is the economy in cores, as the total number of cores is always less than the pattern length itself. This is so because of the applicable rule; namely, if two or more pattern generators have sequence lengths represented by numbers that are relatively prime to each other, then these pattern generators can, by interaction, create a pattern of a sequence whose length is the product of said numbers. This product will always be greater, numerically, than the total numbers of cores required to produce it.

This invention is not limited to the particular details of construction, materials, core combinations, core arrangements, or processes described, as many equivalents will suggest themselves to those skilled in the art. It is accordingly desired that the appended claims be given a broad interpretation commensurate with the scope of the invention within the art.

What is claimed is:

1. In a signal control system, a chain of signal storing elements, a bias winding for entering into the first of said elements a signal of predetermined significance, output winding means for reading said signal out of said elements, feedback winding means of opposite polarity with respect to said bias winding for setting up an opposing magnetic field to prevent any change of magnetic flux in said first of said elements, and means for energizing said read-out means for a period which runs concurrently with the period of operation of said signal entering means.

2. In a signal control system, a signal storing element having an output winding, constantly acting means for entering into said element a series of signals of like significance, and winding means including means in circuit with said output winding for feeding a signal back to said series of signals from said element, in a succession of time intervals, with one signal of the series being removed during each successive time interval.

3. In a signal control system, a chain of signal storing elements, having input and output windings thereon, one of said input windings connected to a source of continuously flowing electric energy of uniform polarity for entering a signal into said chain of elements, shift winding means for causing signals to advance progressively along said chain of elements, additional winding means in circuit with the output windings of predetermined elements for feeding back signals from said predetermined elements to selected points of said chain, inhibit winding means in circuit with said output windings for feeding signals forward to predetermine elements along said chain to set up an opposing magnetic field to prevent any change in said elements by said signal entering means, and means for withdrawing said signals from said signal storing elements.

4. In a signal control system, first and second signal storing elements, input and output winding means on each of said signal storing elements, said input winding means on said first signal storing element including a source of continuously flowing electric energy of uniform polarity for entering a series of signals of like significance into said first element, and inhibit means entirely within the circuit of said signal storing elements including a winding on said second signal storing element of opposite polarity to the input winding means carried by said signal storing element for providing a cancellation of said series of signals entering said signal storing element.

5. In a signal control system, first and second signal storing elements, input and output windings on each of said signal storing elements, means on said first signal storing element including a source of continuously flowing electric energy of uniform polarity for entering a series of input signals into said first element, and means entirely within the circuit of said signal storing elements including a winding of opposite polarity to the input winding carried by said second signal storing element to nullify said signal entering said second signal storing element.

6. A pattern generator comprising a chain of N signal storing elements, means for feeding signals of uniform significance into said chain, means for causing said signals to be transferred along said chain in progression from element to element, and inhibit feedback means entirely within said chain for registering at the end of said chain a pattern consisting of 2N signals, with the individual signals of the pattern varying in accordance with a preassigned intercore variation plan.

7. A pattern generator comprising a chain of N signal storing elements, means for feeding signals of uniform significance into said chain, means for causing said signals to be transferred along said chain in progression from element to element, and means for registering at the end of said chain a pattern consisting of 2N signals, with the individual signals of the pattern varying in accordance with a preassigned feedback variation plan, said registering means including signal inhibiting means in circuit with said chain of signal storing elements applied to a selected point of said chain.

8. In combination with a plurality of chains of signal storing elements, means for feeding signals of uniform significance into said chains, and feedback means in circuit with said chains of signal storing elements for obtaining a pattern consisting of a series of individual signals equal in number to the product obtained by multiplying numbers corresponding to the relative lengths of said chains.

References Cited in the file of this patent

UNITED STATES PATENTS

| | | |
|---|---|---|
| 2,708,219 | Carver | May 10, 1955 |
| 2,708,722 | AnWang | May 17, 1955 |
| 2,709,798 | Steagall | May 31, 1955 |
| 2,710,952 | Steagall | June 14, 1955 |
| 2,713,674 | Schmitt | July 19, 1955 |
| 2,729,808 | Auerbach | Jan. 3, 1956 |
| 2,741,757 | Devol | Apr. 10, 1956 |
| 2,753,545 | Lund | July 3, 1956 |